Oct. 14, 1958  E. T. DUKE  2,855,669
COATED CUT-OFF SAW FOR ASBESTOS ARTICLES
Filed April 28, 1954
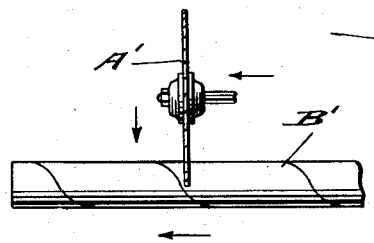
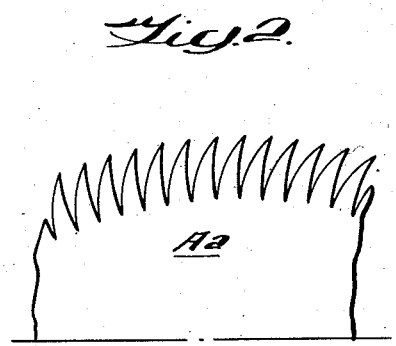
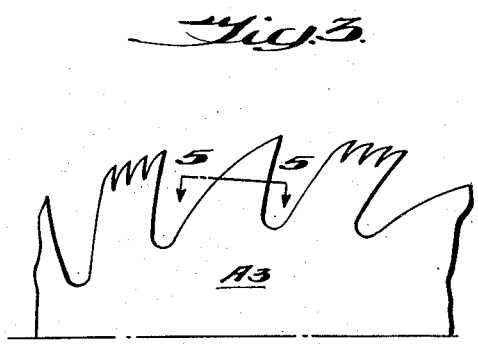
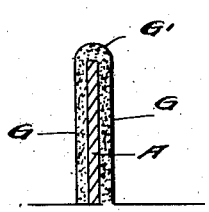
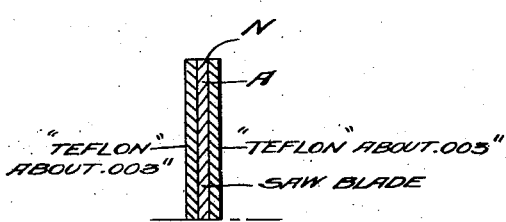
INVENTOR
EDWARD T. DUKE,
BY Hall + Houghton
ATTORNEY United States Patent Office 2,855,669
Patented Oct. 14, 1958

2,855,669

COATED CUT-OFF SAW FOR ASBESTOS ARTICLES

Edward T. Duke, Green Lane, Pa., assignor, by mesne assignments, to Nicolet Industries, Inc., New York, N. Y., a corporation of Delaware Application April 28, 1954, Serial No. 426,183

2 Claims. (Cl. 30—350)

This invention relates to wet cut-off saws particularly adapted for the cutting of asbestos and like paper tubing while the adhesives holding the paper elements together are wet and tacky, and aims to provide an improved saw for such purposes and a method of manufacturing the same.

When making asbestos paper tubes or air-cell pipe covering, saws are employed to cut the tubing into measured lengths. Especially when such tubings are made continuously by winding on a mandrel plain or corrugated asbestos paper or like strips or sheets moistened with inorganic adhesives such as sodium silicate adhesives, by methods such as those described in my copending application with Victor Mauck and Anthony Belfi, filed Jan. 15, 1954, Ser. No. 404,322, now Patent No. 2,788,840 it becomes necessary to cut the tubing as it is continuously delivered and while the adhesive materials are still wet.

The saws customarily used in the cutting of corrugated asbestos pipe coverings or the like are either the so-called needle-toothed paper saw, the tooth shape of which is exemplified in Fig. 2 hereinafter described, or the so-called standard miter-cut or mechanic's cut saw, a combination cross cut and rip saw of the type used in general woodworking operations, which saws have tooth configurations of which the form hereinafter described in connection with Fig. 3 may be taken as typical. Such saws are reasonably satisfactory for the cutting of dry asbestos tubing and the like, though they dull rather rapidly and need frequent resharpening. Similarly such saws are reasonably satisfactory for cutting tubing made with vegetable or animal glues or the like, as such glues are quick setting, especially when the tubing is formed on a heated mandrel, and are substantially dry and non-tacky when the saw cuts are made therethrough.

However, in the case of inorganic type adhesives such as sodium silicates, a too rapid set produces an inferior product from the standpoint of mechanical strength, heat resistance, etc., wherefore, as explained in said copending application, the tubing is delivered from the winding machine with its adhesive components, and especially those in its outer plies, in a moist and tacky state. Because the tubing is continuously delivered and must be laid out straight to cure and dry, it must be severed into uniform lengths while still wet. Needle toothed paper saws are not usable at all for this purpose, for even one complete cut, because they become completely gummed before penetrating appreciably beyond the tooth depth of say one-half inch, and then merely tear instead of cutting the tubing. When an attempt is made to sever such adhesively moist tubes with saws of the combination cross-cut and rip type, the wet silicate adhesives, under the conditions of saw cutting, built up so rapidly on the side faces of the saw teeth and blade, that after approximately 100 to 150 cuts the saws have to be taken out of operation, to be scraped free of hardened adhesive on both side faces, and to have the hardened adhesive supported between the teeth by the side face coatings filed out from between them with consequent interruption of the continuous tube winding process, damage to the edges of the teeth and need for frequent resharpening.

Principal objects of the invention thus are to provide an improved saw adapted to overcome the aforementioned difficulties, and a method of producing such saw, and subsidiary objects and advantages of the invention will become apparent to those skilled in the art from the detailed description of exemplary embodiments thereof hereinafter described.

In applicant's earlier endeavors to solve this problem of gumming, silicone grease was applied to the saw blades but this did not solve the problem; the blades were also painted with silicone varnish with no better results. Finally, however, a method and saw product solving the problem have been worked out, which method and product form the subject matter of the present invention.

Thus the present invention resides in the new special purpose saw, the method of producing the same, and the novel features and combinations contributing to the attainment of the foregoing objects, as hereinafter described and as more particularly pointed out in the appended claims.

In the accompanying drawings exemplying the invention

Fig. 1 is a diagrammatic plan view showing a cut-off saw entering a section of asbestos tubing including wet or moist sodium silicate adhesives.

Figs. 2 and 3 are diagrammatic details of the tooth forms in a typical example of the so-called needle-toothed paper saw, and in a typical example of the so-called combination cross-cut and rip saw, respectively.

Fig. 4 is a diagram illustrating how the adhesive tends to gum or build up on the side faces and straddle the tooth faces of such conventional saws, taken on line 5—5, in Fig. 3.

Fig. 5 is a diagram illustrating the coated saw produced by the present invention that prevents such gumming, also taken on the line 5—5 of Fig. 3, with the thickness of the coating greatly exaggerated.

As shown in Fig. 1, the saws A of the present invention are especially adapted for the cutting of freshly formed laminated articles of asbestos paper still moist with inorganic adhesives, or the like, as exemplified by the freshly formed helically wrapped multi-ply corrugated asbestos air-cell tubing B.

While as above mentioned, needle toothed paper saws as exemplified at A2 in Fig. 2 are completely useless for this purpose, and even combination cross-cut and rip saws as exemplified at A3 in Fig. 3 are of little use for this purpose, the present invention produces saws of both types that are unexpectedly effective for this purpose, that have unpredictably long lives in service without resharpening, and that unpredictably are not divested of their anti-gumming characteristic by resharpening.

Without the present invention, as above noted, even the combination cross-cut and rip saws in 100 to 150 cuts become so gummed with adhesive, as indicated at G in Fig. 4 that it becomes incapable of cutting the material without removal for scraping and filing, the dried adhesive G building up on the sides of the saw to the full depth of cut made thereby and supporting dried adhesive on the tooth faces as at G'.

In accordance with the present invention, this gumming of the saw blades is prevented by applying to the saw blades a baked coating of polytetrafluoroethylene, which material is available in the form of colloidal dispersions of the polymer in water from E. I. du Pont de Nemours & Co. (Inc.) of Wilmington, Delaware, under the trade name of "Teflon."

With saws so coated in accordance with this invention, the saws are not improved materially for cutting dry asbestos tubing and the like, as such employment quickly strips the coating from the saws; but unpredictably, coated saws of this invention when used for cutting freshly made helically wound asbestos tubing or corrugated asbestos air cell tubing still wet with sodium silicate adhesives, have been used for over 75,000 cuts per saw without cleaning the saw even once and without any resharpening, and were then found to still be producing good clean cuts after such extended use. Furthermore, its has unexpectedly been found that saws coated in accordance with this invention can be resharpened, without recoating, and without divesting them of their anti-gumming characteristic. In fact, one saw was resharpened in the normal manner after having made 58,000 cuts (through the sharpness of its cuts showed no noticeable deterioration) and the ground off tooth faces were not recoated. This saw, without cleaning at any time, has now made many thousand additional cuts since resharpening, and shows no tendency to gum and little, if any, dulling.

In practicing the present invention the saw blade is first degreased and cleaned in any conventional manner, most conveniently by light sand-blasting, to promote bonding of the coating to the saw blade. The normal metal primer prepared by DuPont may be used but does not give as satisfactory results as the use as a primer of the so-called "polytetrafluoroethylene one-coat enamel" No. 851–204 not recommended by DuPont for multi-coat work. This enamel comprises 50% solids by weight and weighs 11.6 lbs. per gallon, and in accordance with the present invention the aqueous dispersion is sprayed directly on the sandblasted surfaces of the saws, teeth and all, without use of any other solvent or vehicle, in a thin coating that is dried at under 200° F. and then baked at about 750° F. for 15 to 20 minutes to produce a coating of from 0.5 to 1.0 mil thickness. Three coats of polyfluoroethylene enamel are then similarly applied, with similar drying and baking following each coat, to produce a final film thickness of approximately 0.003". While the polyfluoroethylene gray and red enamels (Nos. 851–201, and 851–203, 43% and 46% solids by weight, and weighing 11.0 and 10.8 pounds per gallon, respectively) give good results, the black enamel No. 851–205 of the "Teflon" brand applied over the "one coat" relatively heavy enamel, appears the best for preparing a wet-cut-off saw capable of resharpening without loss of its non-gumming characteristic.

When a so coated saw is used for wet cutting, it apparently makes no difference whether the faces of the teeth are coated or not, so long as the sides of the blade, including the sides of the teeth and the sides of the body portion of the blade (i. e. the part of the blade which enters the work, other than the teeth), are coated. This observation leads inevitably to the conclusion that if it were not for the adhesive building up on the sides of the uncoated saw, as illustrated at G in Fig. 4, the dried adhesive on the tooth faces, illustrated at G', would readily be knocked off at the start of the ensuing cut. Indeed when the coated saw was re-sharpened, insuring the absence of any coating on the tooth faces themselves, as illustrated at N in Fig. 5, it was found that the grinding of the tooth faces did not chip the polyfluoroethylene enamel from the sides of the teeth, and that any particles of adhesive, or adhesive wet asbestos, that clung to the tooth face, even when allowed to dry thereon, simply dropped off when another cut was started, and did not interfere with the production of a clean cut.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A wet-cut-off saw especially adapted for the cutting of freshly formed laminated articles of asbestos paper containing moist sodium silicate adhesive, and the like, said saw comprising a body portion having cutting teeth projecting therefrom, said body portion and teeth having side faces, and said side faces being coated with polytetrafluoroethylene enamel.

2. A wet-cut-off saw according to claim 1, in which the enamel coating has a thickness of approximately 0.003 inch.

References Cited in the file of this patent

UNITED STATES PATENTS

| | | |
|---|---|---|
| 2,562,117 | Osdal | July 24, 1951 |
| 2,624,381 | Von der Werth | Jan. 6, 1953 |
| 2,685,311 | Ferrari | Aug. 3, 1954 |

OTHER REFERENCES

Ware: DuPont Magazine, June–July 1952, pp. 35–37.

"Hard, Corrosion-Resistant, Slippery," Scientific American, pages 112–114, September 1943. (Copy in Patent Office Scientific Library.)